S. P. M. TASKER.
Pipe-Coupling.

No. 129,691. Patented July 23, 1872.

WITNESSES
Thomas J. Bewley
Jas. H. Harrison

INVENTOR.
Stephen P. M. Tasker
By His Attorney
Stephen Ustick

UNITED STATES PATENT OFFICE.

STEPHEN P. M. TASKER, OF PHILADELPHIA, PENNSYLVANIA.

IMPROVEMENT IN PIPE-COUPLINGS.

Specification forming part of Letters Patent No. 129,691, dated July 23, 1872.

Specification describing certain Improvements in Couplings for Tubes or Conductors of Liquids, invented by STEPHEN P. M. TASKER, of the city of Philadelphia and State of Pennsylvania.

My invention relates to the combination of slotted rings with the connecting-ends of the tubes or conductors and with the coupling-socket, for the purpose of increasing the strength of the joint and covering up the screw-thread when required. The rings may be screwed into the ends of the socket, or else they may have a smooth fit and driven into their places. In the latter case they may be fastened with a set-screw or other device. They are constructed with a longitudinal slot in one side to admit of their contracting to draw tightly on the tubes or conductors. For connecting the rings with tubes or conductors already together they may be separated into two pieces longitudinally, to be screwed or driven into their places separately. Instead of coupling with an independent socket the tubes may have a permanent enlargement on one end to receive the other end of the tubes and the connecting ends of the rings, the latter being either made with a screw-thread or smooth taper.

Figure 1:
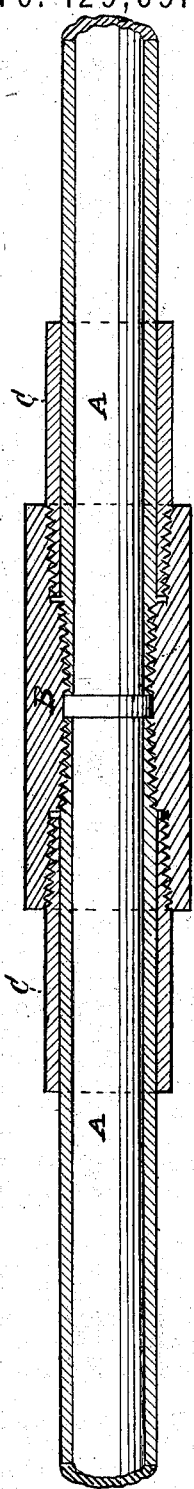
Figure 4:
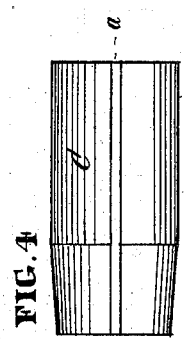
Figure 3:
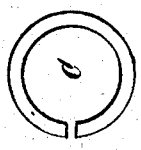
Figure 2:
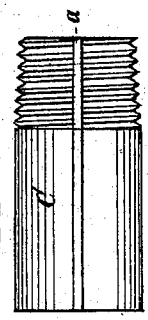
Figure 5:
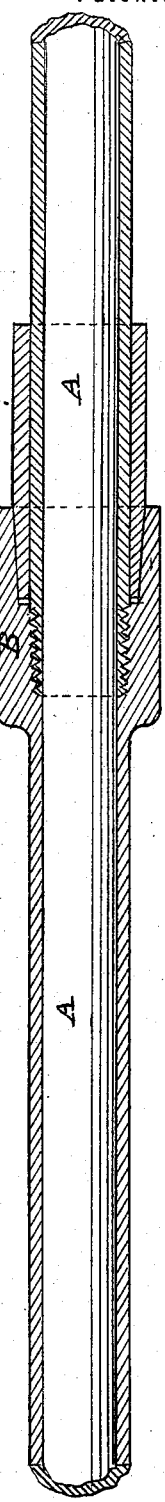
Figure 7:
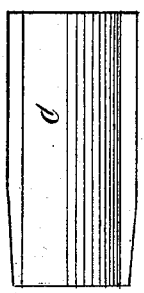
Figure 6:

Figure 1 is a longitudinal section of portions of two tubes, A A, connected together by means of the socket B and rings C C. Figs. 2 and 3 are a side and end views of one of the rings C, having a screw-thread cut on one end. Fig. 4 is a side view of the ring when the screw-thread is dispensed with. Fig. 5 is a longitudinal section of the tube A provided with a permanent socket, B, the ring C having a smooth taper. Figs. 6 and 7 are an end and side views of one half of a ring, C, when the rings are made in two pieces.

Like letters in all the figures indicate the same parts.

A A are tubes connected together by means of the socket B, there being a screw-connection, as seen in Fig. 1. The ends of the tubes and the parts of the coupling B with which they connect are represented tapering to secure tight and very strong joints. The sides may, however, be parallel, if desired. C C are rings, which have a slot, $a$, at one side to admit of their contracting upon the tubes A A, so as to fit tightly thereon to stiffen the joints. The connecting-ends of the rings are tapered, as represented in the drawing, for the purpose of making a tight connection with the tubes and stiffening the joints. Instead of making a screw-connection of the rings they may have a smooth taper, as represented in Figs. 4, 5, 6, and 7. In this case the rings, when driven tightly into the socket, may be secured by means of a set-screw or other device. The rings may be connected after the tubes or conductors are together by making them in two pieces; in which case they may be either connected by means of a screw-thread or have a smooth taper, as represented in Figs. 6 and 7.

In coupling the parts together I first screw the tubes into the sockets and then screw or force the rings into their places. As will readily appear, my mode of coupling the tubes or conductors effects very tight and strong joints, making them very stiff, and susceptible of resisting any swaying that may take place from any cause whatever.

I claim as my invention—

The contractible rings C, having their connecting-ends tapered, either with or without a screw-thread, in combination with the tubes or conductors A and the socket B, substantially in the manner and for the purpose above described.

STEPHEN P. M. TASKER.

Witnesses:
   THOMAS J. BEWLEY,
   STEPHEN USTICK.